United States Patent [19]

Snyder

[11] Patent Number: 4,767,369
[45] Date of Patent: Aug. 30, 1988

[54] WATER SKI

[76] Inventor: Howard E. Snyder, P. O. Box 2278, New Smyrna Beach, Fla. 32070-2278

[21] Appl. No.: 919,269

[22] Filed: Oct. 16, 1986

[51] Int. Cl.$^4$ .............................................. B29D 27/04
[52] U.S. Cl. ........................................ 441/68; 441/74; 280/610
[58] Field of Search ................... 441/68, 65, 74, 79, 441/129; 114/140, 127, 355, 357, 358, 359; 280/601, 602, 609, 610, 815; 272/1 B; 180/180, 182

[56] References Cited

U.S. PATENT DOCUMENTS

| | | | |
|---|---|---|---|
| 3,067,440 | 12/1962 | Blake | 441/68 |
| 3,148,392 | 9/1964 | Bennett | 441/68 |
| 3,414,919 | 12/1968 | Gust | 441/74 |
| 3,422,471 | 1/1969 | Morey | 441/74 |
| 3,740,301 | 6/1973 | Manning | 441/68 |
| 3,802,010 | 4/1974 | Smith | 441/74 |
| 4,255,221 | 3/1981 | Young | 441/74 |
| 4,320,546 | 3/1982 | Knox | 441/74 |
| 4,349,212 | 9/1982 | Svoboda | 280/61 C |
| 4,383,955 | 5/1983 | Rubio | 441/74 |
| 4,531,922 | 7/1985 | Schutz | 441/74 |

*Primary Examiner*—Sherman D. Basinger
*Assistant Examiner*—Clifford T. Bartz
*Attorney, Agent, or Firm*—James H. Beusse

[57] ABSTRACT

A water ski including a core and an outer skin enveloping the core. The core comprises two transversely spaced longitudinal core members and a longitudinal stringer interposed between and fixedly secured to the two core members. The stringer provides longitudinal rigidity and resilience to the water ski.

5 Claims, 2 Drawing Sheets

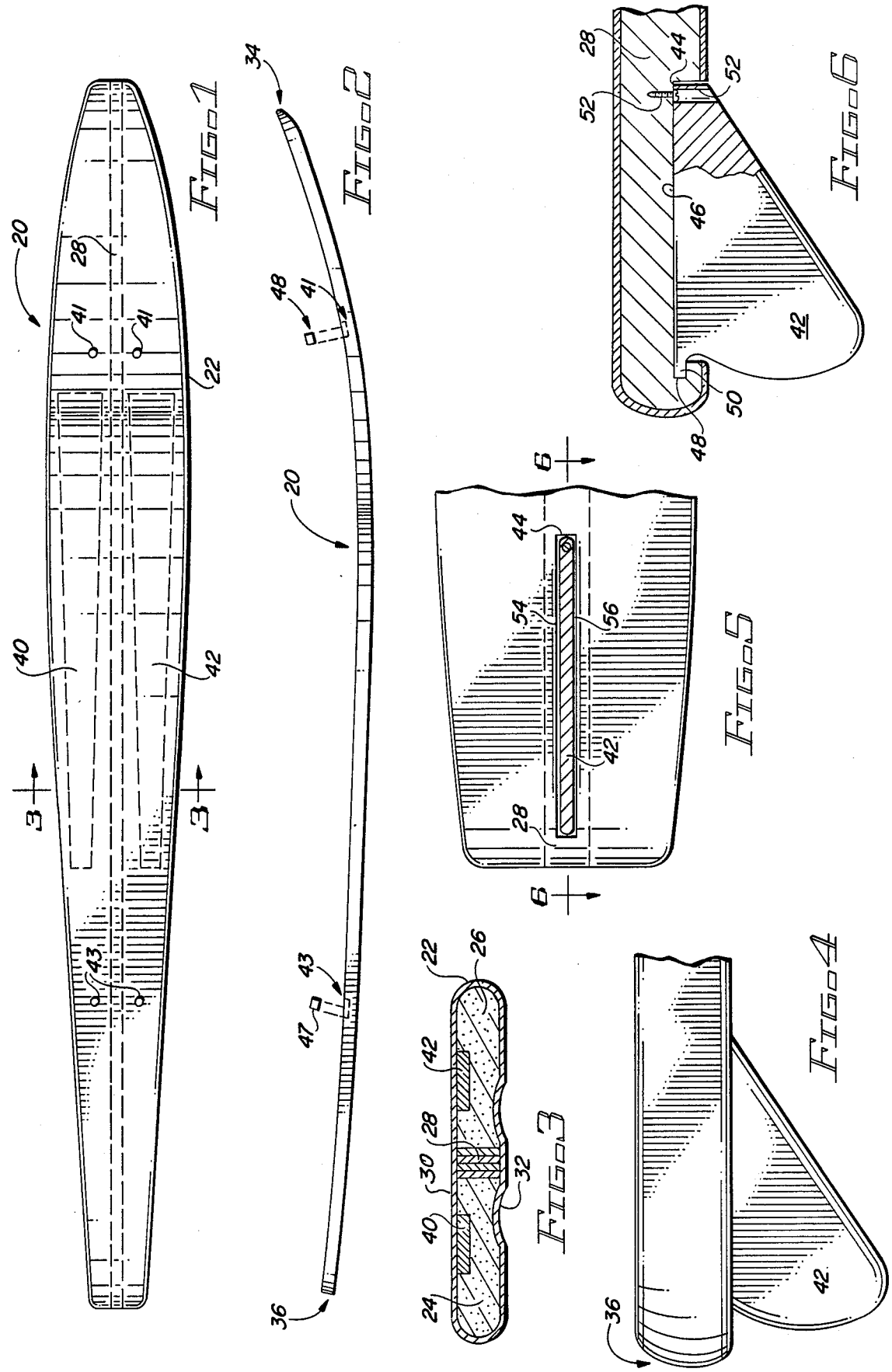

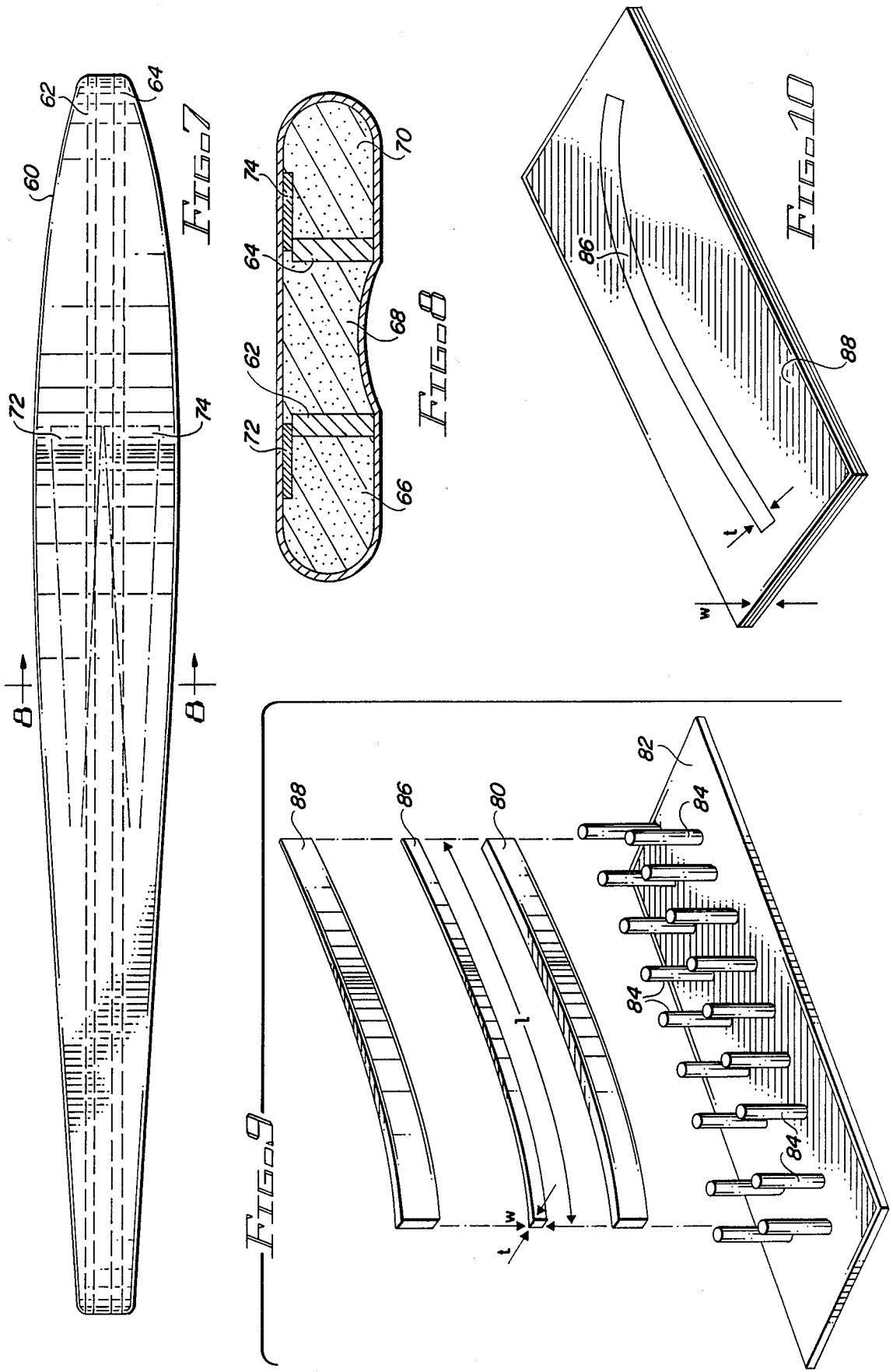

WATER SKI

FIELD OF THE INVENTION

This invention relates to water ski structures and, more particularly, to a water ski structure having a lightweight core which includes a longitudinal stringer.

BACKGROUND OF THE INVENTION

The construction of many prior art skis include an outer skin or casing filled with a core material different from the outer skin. Typically, the outer skin is formed of a fiber-reinforced plastic such as fiberglass or some other laminate material. Typical core materials that have been used include wood or expanded plastic material. The rigidity of such skis generally depends upon the core material selected and/or the thickness of the skin. Rigidity of prior art skis either required a hardwood core such as an oak core or an increase in the thickness of the skin. Using a hardwood core greatly increases the weight of the ski, thus reducing its buoyancy. A reduction in buoyancy increases the drag of the ski since the ski sits deeper in the water and the ski provides greater resistance through the water instead of the ski gliding along the water surface. Increasing the thickness of the skin also increases both the weight and buoyancy of the ski.

Additionally, a substantial increase in skin thickness is required to have much effect on the longitudinal rigidity of the ski. This is because the skin is a thin sheet. Thin sheets are not very resilient when subject to forces normal to a face of the sheet. For example, a thin sheet of aluminum, when subject to a particular force, will flex a greater amount than will an aluminum beam having the same mass as the sheet.

Some skis have incorporated means for increasing torsional rigidity. By torsional rigidity, it is meant the ability of the ski to oppose twisting when subject to transverse forces. U.S. Pat. No. 4,094,528 to Cluzel discloses a ski requiring a trapezoidal core of foam material which is wrapped in a fiber-reinforced plastic material. The purpose of the trapezoidal core is to provide greater resistance to lateral forces. A disadvantage of the Cluzel ski is that the trapezoidal member increases both the torsional rigidity and the longitudinal rigidity simultaneously. To increase the torsional rigidity, the trapezoidal foam material is wrapped in a greater amount of plastic material. However, this also increases the longitudinal rigidity. Since the torsional rigidity cannot be selected independent of the longitudinal rigidity, independent characteristics of the ski cannot be selected for each individual skier.

Another disadvantage of the skis described above is that each ski's resonant frequency cannot be selected independent of its rigidity. By resonant frequency, it is meant the frequency which causes the greatest vibration on the ski. A ski traveling on water passes over ripples in the water. If the ski strikes the ripples at a rate equal to the resonant frequency, the ski will vibrate. Such vibration is undesirable because it reduces the user's control of the ski and also fatigues the user.

SUMMARY OF THE INVENTION

It is an object of the present invention to provide an improved water ski which overcomes the above discussed disadvantages.

It is another object of the present invention to provide a ski construction in which the rigidity does not significantly affect the weight of the ski.

It is a further object of the present invention to provide a ski having a longitudinal stringer for increasing the longitudinal rigidity of the ski.

It is still a further object to provide a water ski having at least one longitudinal strut on its top surface for providing torsional rigidity to the ski.

It is yet another object of the present invention to provide a ski construction in which the longitudinal rigidity of the ski can be chosen substantially independently of the torsional rigidity of the ski.

It is yet a further object of the present invention to provide a ski construction in which the resonant frequency of the ski can be chosen substantially independently of the rigidity of the ski.

In general, the present invention is a water ski including a core and an outer skin enveloping the core. The core comprises two transversely spaced longitudinal core members and a longitudinal stringer interposed between and fixedly secured to the two core members. The stringer provides longitudinal rigidity to the water ski.

More particularly, the core defines a tip end, a tail end aft of the tip end, a top surface and a bottom surface. In one form of the invention, the ski includes at least one longitudinal strut adjacent to the top surface. The strut provides torsional rigidity to the ski. Additionally, the strut provides a surface for supporting foot bindings and the like. Preferably, the core members comprise an expanded plastic (foam). In another form of the invention, the water ski includes a removable fin secured to the ski's bottom surface. The fin includes a first end and a second end. The first end has a tab dimensioned for mating with a slot in the bottom surface. The second end includes fastening means for removably securing the second end to the bottom surface. By disjoining the fin at the second end, the fin can be removed from the bottom surface of the ski. The ski may also include a plurality of longitudinal stringers separating a corresponding plurality of core members.

BRIEF DESCRIPTION OF THE DRAWINGS

The present invention is illustrated by way of example in the Figures of the accompanying drawings in which:

FIG. 1 illustrates a top view of a water ski in accordance with the present invention;

FIG. 2 illustrates a side elevation view of the water ski in FIG. 1;

FIG. 3 illustrates a cross-section view taken along the lines 3—3 of FIG. 1;

FIG. 4 illustrates the tail section of a water ski having a removable fin;

FIG. 5 illustrates a bottom view of the tail section illustrated in FIG. 4;

FIG. 6 illustrates a side elevation view, in section of the tail section taken along the lines 6—6 of FIG. 5;

FIG. 7 illustrates another embodiment of the water ski having two longitudinal stringers;

FIG. 8 illustrates a cross-section view taken along the line 8—8 of FIG. 8;

FIG. 9 illustrates an exploded perspective view of the water ski core to be assembled in a jig; and FIG. 10 illustrates a perspective view of a plywood sheet from which a stringer is formed.

DETAILED DESCRIPTION OF THE PREFERRED EMBODIMENTS

FIGS. 1 through 3 illustrate a water ski 20 in accordance with the present invention. In general, the water ski includes an inner core and an outer skin 22. The core forms substantially the shape of the water ski 20. In a preferred embodiment, the core includes first and second longitudinal core portions 24 and 26 and a longitudinal stringer 28. The longitudinal stringer 28 is interposed between the first and second core members 24 and 26.

The stringer 28 provides longitudinal rigidity and resiliency to the ski 20. The stringer 28 may be formed of wood, or other light weight resilient but rigid materials such as aluminum. The resiliency of the ski is changed by changing the resiliency of the stringer 28. A ski with a wide stringer has better resiliency than does a ski with a narrow stringer. Of course, this is true only if the stringers are made of the same material.

By providing longitudinal rigidity and resiliency with the stringer 28, the ski 20 can have a high longitudinal resiliency yet still be lightweight. Preferably, the core members 24 and 26 are formed of an expanded plastic or other synthetic material such as polyurethane foam. It is to be understood that the core members 24 and 26 could be formed of some other light weight solid such as balsa wood. The outer skin 22 is preferably fomed of a fiber-reinforced laminant material such as Kevlar cloth and resin or fiberglass cloth and resin to waterproof the core. The skin 22 also protects the core from damage due to impact during use and provides additional structural support to the ski 20.

The water ski further includes a top surface 30, a bottom surface 32, a leading end 34, and a trailing end 36. Struts 40 and 42 are positioned between the top surface of the core and the outer skin 22. The struts 40 and 42 traverse a longitudinal portion of the ski 20 and provide two primary functions. First, the struts 40 and 42 provide structural integrity to support foot bindings, well known in the art. Second, the struts 40 provide torsional rigidity to the ski 20. As will be explained in greater detail below, another function of the struts 40 is to change the resonant frequency of the ski 20. The torsional rigidity opposes transverse forces which cause twisting of the ski 20. The struts may be formed of extruded fiberglass, aluminum, or any other light weight rigid material. The length and thickness of the struts 40 and 42 can be selected to meet specific resiliency characteristics. Additionally, the struts 40 and 42 may extend towards the aft end 36 to provide support to bindings of a slalom ski (a ski requiring special bindings to enable a user to place both of his feet on a single ski). Thus, by varying the stringer 28 and the struts 40 and 42, rigidity and resiliency characteristics can be selected to customize the ski 20 to a particular user's desires.

The struts 40 may also be used to vary the resonant frequency of the ski 20. By providing struts having vibrational characteristics which differ from the rest of the ski's vibration characteristics, the resonant frequency can be appropriately selected. The ski 20 further includes front and rear apertures 41, 43 and corresponding front and rear weighted plugs 45, 47. Varying the weight of the plugs 45 and 47 varies the resonant frequency of the ski 20. For example, increasing the weight of the plugs 45 and 47 decreases the resonant frequency of the ski. By varying the weight of the plugs, 45 and 47, the vibrational characteristics can be varied to correspond to the diverse weights of all users. Thus, the resonant frequency can be selected to minimize vibration during use by use of struts 40, plugs 45, 47 or a combination of the two.

Reference is now made to FIGS. 4 through 6 which illustrates the tail end 36 of the ski 20 adapted with a fin 48. Preferably, the fin 48 is removable. Different fins provide different cutting characteristics. An individual skier may desire interchanging fins depending upon the type of skiing he will do. By providing removable fins 48, such interchangeability can be accomplished. In this embodiment, the stringer 28 includes a longitudinal channel 44 adapted to receive a top edge 46 of the fin 48. The rear portion of the channel 44 terminates into a longitudinal slot 49. The slot 49 mates with a corresponding tab 50 on the fin 48. The forward portion of the fin 48 is secured to the stringer 28 by a threaded fastener 52. The fin 48 is constrained longitudinally between the slot 49 and a forward wall 52. The fin 48 is constrained laterally between longitudinal side walls 54 and 56 of the channel 44. Removal of the fin 48 is accomplished by first removing the fastener 52, pulling the forward portion of the fin 48 outward and away from the channel 46, and sliding the tab 50 longitudinally forward and away from the slot 49. Since only one fastener needs to be disengaged to remove the fin 48, replacement of the fin 48 can be accomplished quickly and easily.

Reference is now made to FIGS. 7 and 8 which illustrate another embodiment of the present invention in which a ski 60 includes two longitudinal stringers 62 and 64. The two stringers 62 and 64 separate three core portions 66, 68, and 70. A ski having two transversely spaced longitudinal stringers has a greater torsional rigidity than a ski having just one stringer. Assuming that the stringers in both skis are made from the same material and that the combined thickness of the two stringers equals the thickness of the sole stringer, a greater torque would be needed to twist the ski having two stringers than to twist the ski having one stringer. Accordingly, the torsional rigidity of the ski having two stringers is greater than the torsional rigidity of the ski having just one stringer.

As with the embodiment illustrated in FIGS. 1 through 3, the ski illustrated in FIGS. 7 and 8 further includes longitudinal struts 72 and 74 to further increase the torsional rigidity of the ski. In addition to improving the torsional rigidity of the ski, the struts 72 and 74 provide a mounting surface to support foot bindings, well known in the art. Although both embodiments illustrate skis having two struts, it is to be understood that the ski could be provided with one centrally located strut or a plurality of struts.

Reference is made to FIG. 9 which illustrates the preferred method of assembling a ski in accordance with the present invention. First, a synthetic foam sheet (not shown) is provided. Such sheets, well known in the art, come in various sizes and thicknesses. A first strip 80 having a particular thickness is cut to a desired length and width. For example, a strip having a thickness T of one and a half inches is cut such that its width W is three-and a half inches and its length L is seventy inches. The strip 80 is then placed into a jig having the curvature of a ski. The jig 82 includes a plurality of dowels 84 which hold the sheet 80 in the desired curvature. Next, a curved longitudinal member 86 acting as the ski's stringer is provided. The stringer member 86 may be wood or any other substantially rigid material. In the preferred embodiment, the stringer member 86 is made from a sheet of plywood. For example, a stringer member 86 may be cut from a one half inch thick sheet of plywood. As shown in FIG. 10, the stringer member 86 is cut from the plywood sheet 88 such that it curves in the shape of a ski. In an exemplary ski, the thickness T of the stringer member 86 is one and a half inches (the same thickness as the strip 80), the width W is one half inch and the length L equals 70 inches. The stringer member 86 is then placed in the jig 82 and adhesively secured to the strip 80. Next, a second strip 90 having the same dimensions as strip 80 is placed in the jig and adhesively secured to the stringer member 86. The two strips 80, 90 and the stringer member 86 comprise the core of a ski. The strips 80, 88 become the core members 24, 26 shown in cross-section in FIG. 3. The stringer member 86 becomes the stringer 28 of FIGS. 1-3.

The adhesive is allowed to harden and the core is removed from the jig 82. Next, the core is shaped to the shape of a ski by sanding or other means well known in the art. Next, struts 40, 42 as shown in FIGS. 1 and 3 are adhesively secured in the top surface of the core. Slots may be machined in the top surface for receiving the struts. Fiberglass cloth or the like is then laminated over the struts and core to form the outer skin. After the outer skin has cured, the pre-formed fin 48 may be laminated to ski 20 using fiberglass cloth, bindings and resin, if a non-removeable fin is desired. Otherwise, the slot 49 may be formed for receiving a fin. The assembled ski is then again sanded and polished. Although the assembled ski has been described as having particular dimensions, it is to be understood that the ski could be formed of members having different dimensions to satisfy the particular requirements of an individual skier. Additionally, the described method could also be used to make a ski having a plurality of stringers as well as different struts.

It is to be understood that a ski in accordance with the present invention could also be formed by other methods. For example, the ski's core could be formed with a mold, well known in the art. A stringer is placed longitudinally in the mold and a fluent hardenable foam is injected into the mold around the stringer. After the foam has hardened, the core is removed from the mold and the ski is completed as described above. It is also to be understood that the struts could be inserted into the mold before the foam is injected.

While the principles of the invention have now been made clear in an illustrative embodiment, it will become obvious to those skilled in the art that many other modifications in structure, arrangement, portions and components may be used in the practice of the invention without departing from those principles. Accordingly, it is intended that the description be interpreted as illustrative and not in the limiting sense and that the invention be given a scope commensurate with the appended claims.

What is claimed is:

1. A method of constructing a water ski having a core and an outer skin enveloping the core, the core including first and second transversely spaced longitudinal core members, and a longitudinal stringer interposed between the core members, the core members and stringer defining a top surface and a bottom surface, the water ski further including at least one longitudinal strut adjacent the top surface, the strut being adapted for supporting foot bindings, the method comprising the steps of:

providing a jig defining the shape of a ski;
   placing the first core member in the jig;
   placing the stringer in the jig and bonding the stringer to the first core member;
   placing the second core member in the jig and bonding the second core member to the stringer;
   removing the first core member, the stringer and the second core member from the jig;
   bonding the strut to the top surface; and
   enveloping the first core member, stringer, strut and second core member with the outer covering.

2. A method in accordance with claim 1 further comprising the step of polishing the outer covering.

3. A method in accordance with claim 1 wherein the water ski further includes a fin secured to the bottom surface, and wherein the removing step further includes bonding the fin to the bottom structure.

4. A water ski comprising:

a core formed of a plurality of longitudinally extending core members with at least one longitudinal stringer interposed between adjacent core members, said stringer being selected to provide a predetermined longitudinal rigidity and resilience to the ski;
   at least one strut adhesively attached to siad core, said strut being oriented in a plane perpendicular to a plane of said stringer and being selected to provide a predetermined torsional rigidity to the ski; and
   a balance weight coupled to the ski, said balance weight being selectively adjustable so as to control the vibrational characteristics and resonant frequencies of the ski.

5. A water ski in accordance with claim 4 wherein said balance weight comprises a weight removably secured to and recessed within the top surface.

* * * * *